(12) United States Patent
Yamamoto

(10) Patent No.: US 11,370,320 B2
(45) Date of Patent: Jun. 28, 2022

(54) ELECTRONIC CONTROL DEVICE FOR IN-VEHICLE USE

(71) Applicant: AISIN CORPORATION, Kariya (JP)

(72) Inventor: Yusuke Yamamoto, Aichi (JP)

(73) Assignee: AISIN CORPORATION, Kariya (JP)

( * ) Notice: Subject to any disclaimer, the term of this patent is extended or adjusted under 35 U.S.C. 154(b) by 476 days.

(21) Appl. No.: 16/493,977

(22) PCT Filed: Apr. 6, 2018

(86) PCT No.: PCT/JP2018/014692
§ 371 (c)(1),
(2) Date: Sep. 13, 2019

(87) PCT Pub. No.: WO2018/186483
PCT Pub. Date: Oct. 11, 2018

(65) Prior Publication Data
US 2020/0122600 A1 Apr. 23, 2020

(30) Foreign Application Priority Data

Apr. 6, 2017 (JP) .............................. JP2017-075922

(51) Int. Cl.
*B60L 58/10* (2019.01)
*B60L 3/00* (2019.01)

(52) U.S. Cl.
CPC ............. *B60L 58/10* (2019.02); *B60L 3/0046* (2013.01); *B60L 2240/547* (2013.01)

(58) Field of Classification Search
CPC ... B60L 58/10; B60L 3/0046; B60L 2240/547
(Continued)

(56) References Cited

U.S. PATENT DOCUMENTS

| | | | |
|---|---|---|---|
| 2006/0024071 A1* | 2/2006 | Takami | G03G 15/2039 399/33 |
| 2011/0175445 A1* | 7/2011 | Hung | H01M 10/46 307/24 |
| 2018/0236998 A1* | 8/2018 | Ono | B60W 10/02 |

FOREIGN PATENT DOCUMENTS

| | | |
|---|---|---|
| JP | 08-198038 A | 8/1996 |
| JP | 2006-321350 A | 11/2006 |

(Continued)

OTHER PUBLICATIONS

International Search Report of PCT/JP2018/014692 dated May 1, 2018.

*Primary Examiner* — Gertrude Arthur Jeanglaude

(74) *Attorney, Agent, or Firm* — Sughrue Mion, PLLC

(57) ABSTRACT

An electronic control device including a first power supply path that supplies power from a battery for in-vehicle use through an electric power supply terminal, to a load; a first disconnecting part in the first power supply path and performs connection/cutoff of the first power supply path; a second power supply path that supplies power from the battery for in-vehicle use, to a control part that controls the first disconnecting part, through a control power supply terminal and a power supply IC; a third power supply path that supplies power from the control power supply terminal, to a connecting point between the first disconnecting part and the load in the first power supply path from a point between the control power supply terminal and the power supply IC in the second power supply path; a second disconnecting part that is provided in the third power supply path and performs connection/cutoff of the third power supply path; and a detecting part that detects a voltage in the first power supply path.

6 Claims, 5 Drawing Sheets

(58) Field of Classification Search
USPC .......................................................... 701/22
See application file for complete search history.

(56)     References Cited

FOREIGN PATENT DOCUMENTS

| JP | 2007-082374 A | 3/2007 |
| JP | 2007-112364 A | 5/2007 |
| JP | 2014-136560 A | 7/2014 |
| JP | 2015-231269 A | 12/2015 |

\* cited by examiner

ELECTRONIC CONTROL DEVICE FOR IN-VEHICLE USE

CROSS REFERENCE TO RELATED APPLICATIONS

This application is a National Stage of International Application No. PCT/JP2018/014692 filed Apr. 6, 2018, claiming priority based on Japanese Patent Application No. 2017-075922 filed Apr. 6, 2017.

TECHNICAL FIELD

The present disclosure relates to an electronic control device for in-vehicle use.

BACKGROUND ART

Conventionally, an ECU which is an electronic control device for in-vehicle use has included a power supply line through which power is supplied to a control target of the ECU from an in-vehicle battery by an operator turning on a so-called ignition switch that brings a de into a travelable state; and an accessary line through which electric power is supplied to a microcomputer that forms the ECU from the in-vehicle battery by the operator turning on a so-called accessary switch that supplies electric power to in-vehicle electrical components.

Then, the ECU has performed control to supply or cut off power to the control target, which is triggered (activation signal) by supply or cutoff of electric power through the accessary line.

Therefore, when electric power is not supplied to the ECU due to the break, ground fault, etc., of the power supply line through a battery terminal, there has been a possibility that the control target of the ECU may stop its operation.

To solve this problem, Patent Literature 1 proposes redundancy of power lines which is achieved by providing two power lines, each of which connects-vehicle battery to an ECU, and two accessary lines.

CITATIONS LIST

Patent Literature

Patent Literature 1: JP 2006-321350 A

SUMMARY OF DISCLOSURE

Technical Problems

In a technique described in the above-described Patent Literature 1, in order to achieve redundancy of power lines, there are provided two power lines, each of which connects an in-vehicle battery to a control target of an ECU, and two harnesses are required for the power lines, and thus, there has been a possibility of an increase in weight and cost.

The present disclosure is made in view of the above description, and provides an electronic control device for in-vehicle use that is capable of effectively achieving redundancy of power lines with a simple configuration.

Solutions to Problems

An electronic control device for in-vehicle use of an embodiment is an electronic control device for in-vehicle use that operates by receiving electric power supply from a battery for in-vehicle use, and includes a first electric power supply path for supplying electric power to a load, the electric power being supplied from the battery for in-vehicle use through an electric power supply terminal; a first disconnecting part that performs connection/cutoff of the first electric power supply path; a second electric power supply path that supplies electric power to a control part through a control power supply terminal and a power supply IC, the electric power being supplied from the battery for in-vehicle use, and the control part controlling the first disconnecting part; a third electric power supply path for supplying electric power to a connecting point between the first disconnecting part and the load, the electric power being supplied through the control power supply terminal; a second disconnecting part that performs connection/cutoff of the third electric power supply path; and a detecting part that detects a voltage in the first electric power supply path.

Effects of Various Aspects of the Disclosure

According to the above-described configuration, when cutoff of electric power supply through the first electric power supply path has been detected, electric power can be supplied to the load from the battery for in-vehicle use by controlling the second disconnecting part to connect the third electric power supply path to the control power supply terminal, based on a voltage in the first electric power supply path. Thus, redundancy of electric power supply paths can be achieved without making a configuration complex.

DESCRIPTION OF EMBODIMENTS

An embodiment of an electronic control device for in-vehicle use will be described in detail below with reference to the accompanying drawings. Although the present embodiment describes an example in which an electronic control device for a vehicle is applied to an electronic control unit (ECU), the device may be applied to other electronic control devices for in-vehicle use.

Figure 1:
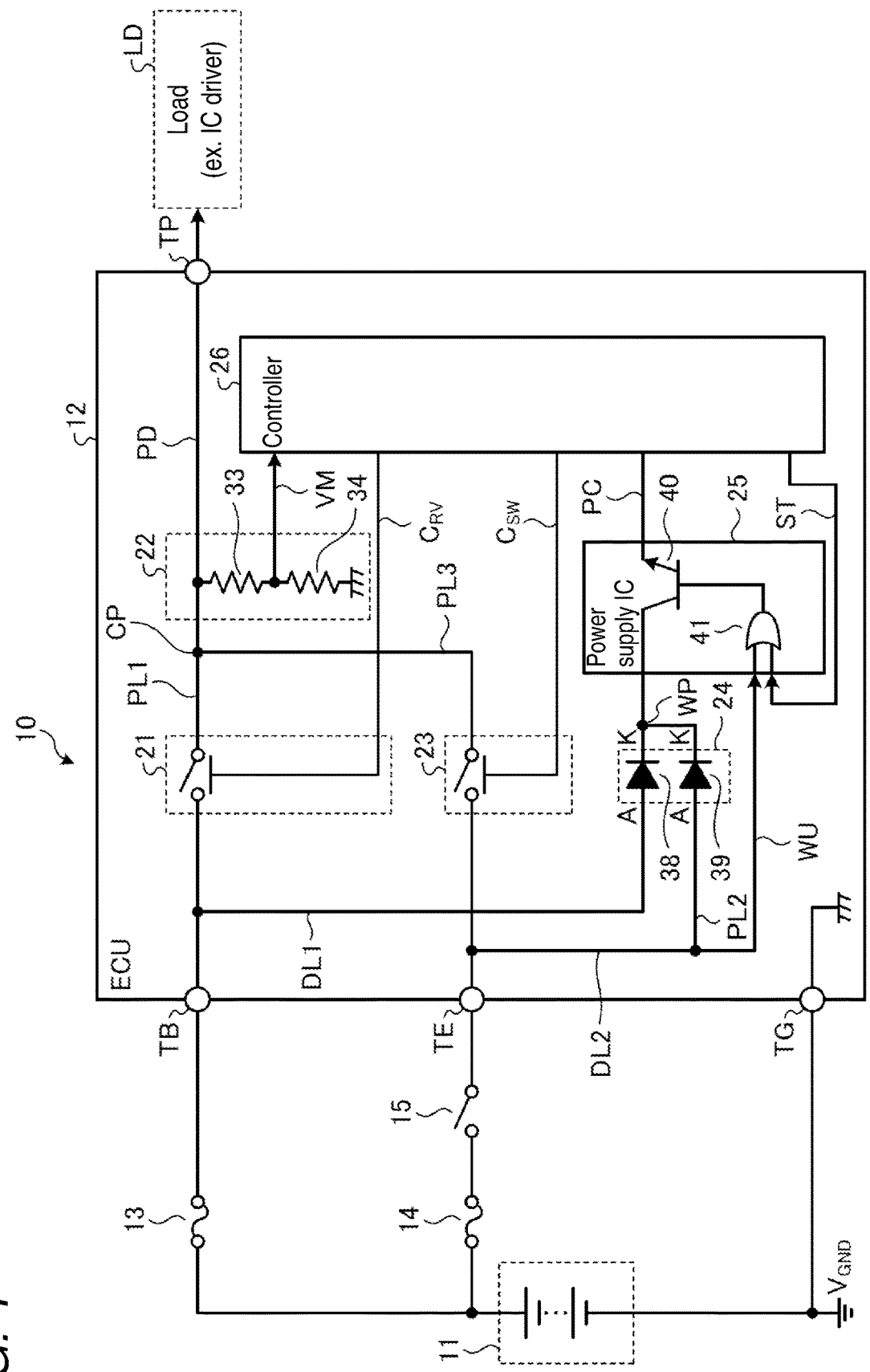
FIG. 1 is a schematic configuration block diagram of an ECU included in a control system for in-vehicle use of an embodiment.

FIG. 1 is a schematic configuration block diagram of an ECU included in a control system for in-vehicle use of an embodiment.

A control system for in-vehicle use 10 includes a battery for in-vehicle use 11; and an ECU 12 that controls in-vehicle devices by receiving electric power supply from the in-vehicle battery 11.

The ECU 12 includes a battery terminal TB that is connected to a high-potential-side terminal of the in-vehicle battery 11 through a fuse 13, and functions as an electric power supply terminal; a control power supply terminal TE which is connected to the high-potential-side terminal of the in-vehicle battery 11 through a fuse 14 and a switch 15 for supplying electric power to in-vehicle electrical components, and to which control power is supplied; a ground terminal TO for connecting the frame ground of the ECU 12 to a low-potential-side terminal (power supply ground) of the in-vehicle battery 11; and an electric power supply terminal TP for supplying electric power to a load LB connected to its subsequent stage.

In addition, in the ECU 12, between the battery terminal TB and the electric power supply terminal TP there are connected a first supply switch 21 that functions as a first disconnecting part for supplying electric power from the in-vehicle battery 11 to the load LD through the electric power supply terminal TP at normal times, and preventing electric power from going around from the control power supply terminal TE to the battery terminal TB when electric power supply from the battery terminal TB is cut off; and a voltage detecting part 22 that detects a voltage to detect whether there is electric power supply from the battery terminal TB to the electric power supply terminal TP.

In addition, in the ECU 12, a second supply switch 23 that functions as a second disconnecting part for supplying electric power to the electric power supply terminal TP when electric power supply from the battery terminal TB is cut off is connected to the control power supply terminal TE and a connecting point between the first supply switch 21 and the voltage detecting part 22.

In addition, the ECU 12 includes an electric power supplying part 24 that supplies electric power supplied from the battery terminal TB or the control power supply terminal TE, as electric power for operation; a power supply IC 25 that detects that the switch 15 has been turned on and a voltage serving as a wake-up signal WU has been applied, and supplies the electric power supplied through the electric power supplying part 24, as controller drive power PC; and a controller 26 that functions as a control part that goes into an operating state by the controller drive power PC supplied from the power supply IC 25, and controls the entire ECU 12.

Now, each part of the ECU 12 will be described in detail.

The first supply switch 21 functions as the first disconnecting part, and on/off control of the first supply switch 21 is performed by a first disconnection control signal $C_{RV}$.

The voltage detecting part 22 includes a voltage-dividing resistor 33 and a voltage-dividing resistor 34, and divides the voltage of electric power for driving PD and outputs the divided voltage as a voltage monitoring signal VM.

The second supply switch 23 functions as the second disconnecting part, and on/off control of the second supply switch 23 is performed by a second disconnection control signal $C_{SW}$.

The electric power supplying part 24 includes a first diode 38 whose anode A is connected to the battery terminal TB; and a second diode 39 whose anode A is connected to the control power supply terminal TE and whose cathode K is connected to a cathode K of the first diode 38 in a common manner.

The power supply IC 25 includes an NPN bipolar transistor 40 that has a collector terminal to which are connected the cathode of the first diode 38 and the cathode of the second diode 39 which are included in the electric power supplying part 24, and has an emitter terminal connected to the controller 26, and that outputs controller drive power PC through the emitter terminal; and an OR circuit 41 whose one of input terminals is connected to the control power supply terminal TE to accept as input a wake-up signal WU, and whose other input terminal is connected to the controller 26 to accept as input a maintenance signal ST from the controller 26, and whose output terminal is connected to a base terminal of the NPN bipolar transistor 40, and places the NPN bipolar transistor 40 in an on state when either one of the wake-up signal WU and the maintenance signal ST is at an "H" level, to supply supplied electric power which is at least one of supplied electric power from the battery terminal TB and supplied electric power from the control power supply terminal TE, as controller drive power PC, to the controller 26.

The controller 26 goes into a driving state when the controller drive power PC is supplied thereto, and starts monitoring based on the voltage monitoring signal VM, and outputs the first disconnection control signal $C_{RV}$, the second disconnection control signal $C_{SW}$, and the maintenance signal ST, depending on conditions.

In the above-described configuration, electric power is supplied to the battery terminal TB from the battery 11 through the fuse 13, and an electric power supply path from the battery terminal TB to the electric power supply terminal TP through the first supply switch 21 is a first electric power supply path PL1.

In addition, electric power is supplied to the control power supply terminal TE from the battery 11 through the fuse 14 and the switch 15, and an electric power supply path that supplies the controller drive power PC to the controller from the control power supply terminal TE through the second diode 39 and the power supply IC 25 is a second electric power supply path PL2.

Furthermore, an electric power supply path from the control power supply terminal TE through the second supply switch 23 to the connecting point CP which is provided on a downstream side of the first supply switch 21 in the first electric power supply path PL1 is a third electric power supply path PL3.

Next, operation of the embodiment will be described in detail.

(1) Operation Performed at Normal Times

First, operation performed at normal times will be described.

Figure 2:
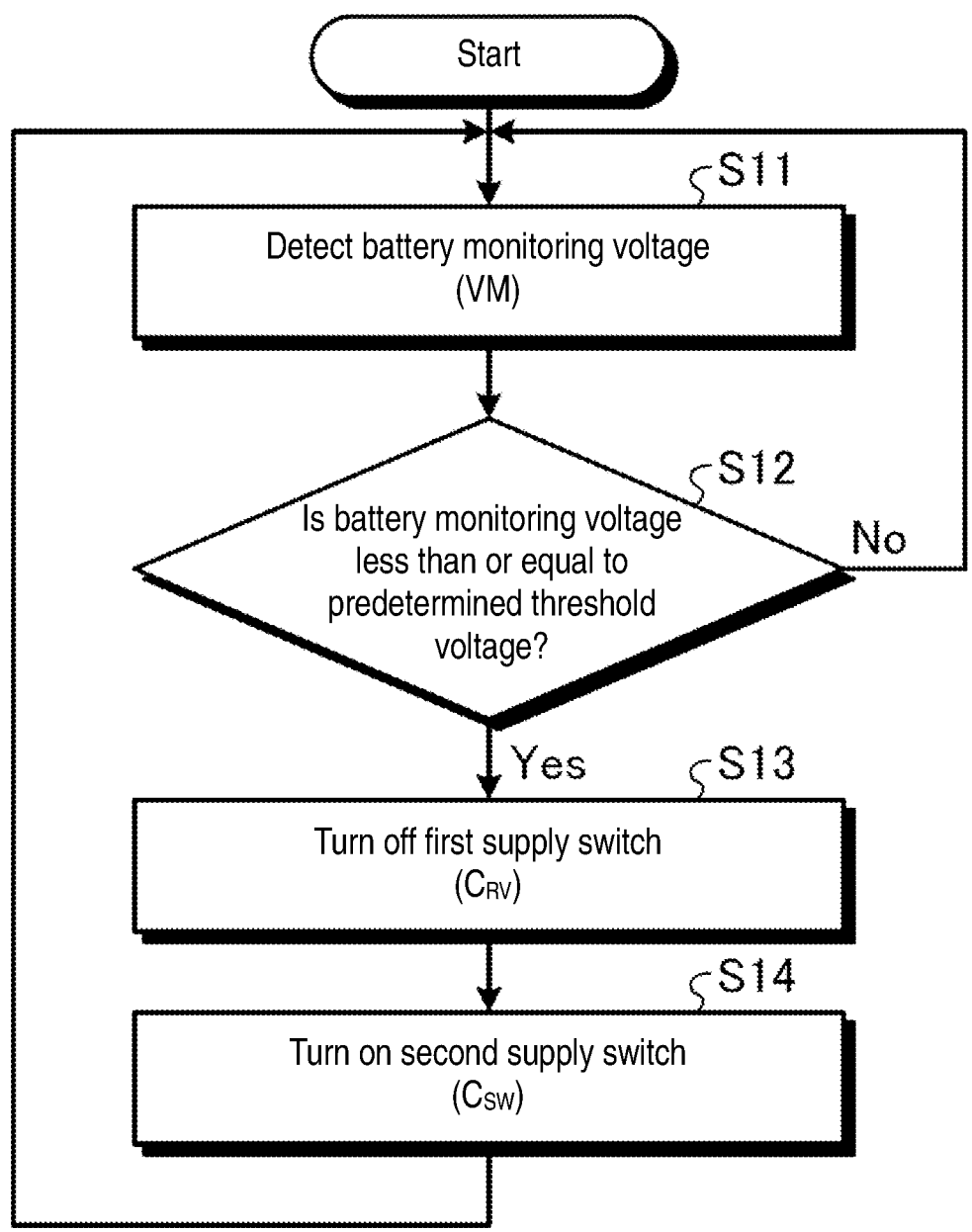
FIG. 2 is a process flowchart of a controller 26.

FIG. 2 is a process flowchart of the controller 26.

Figure 3:
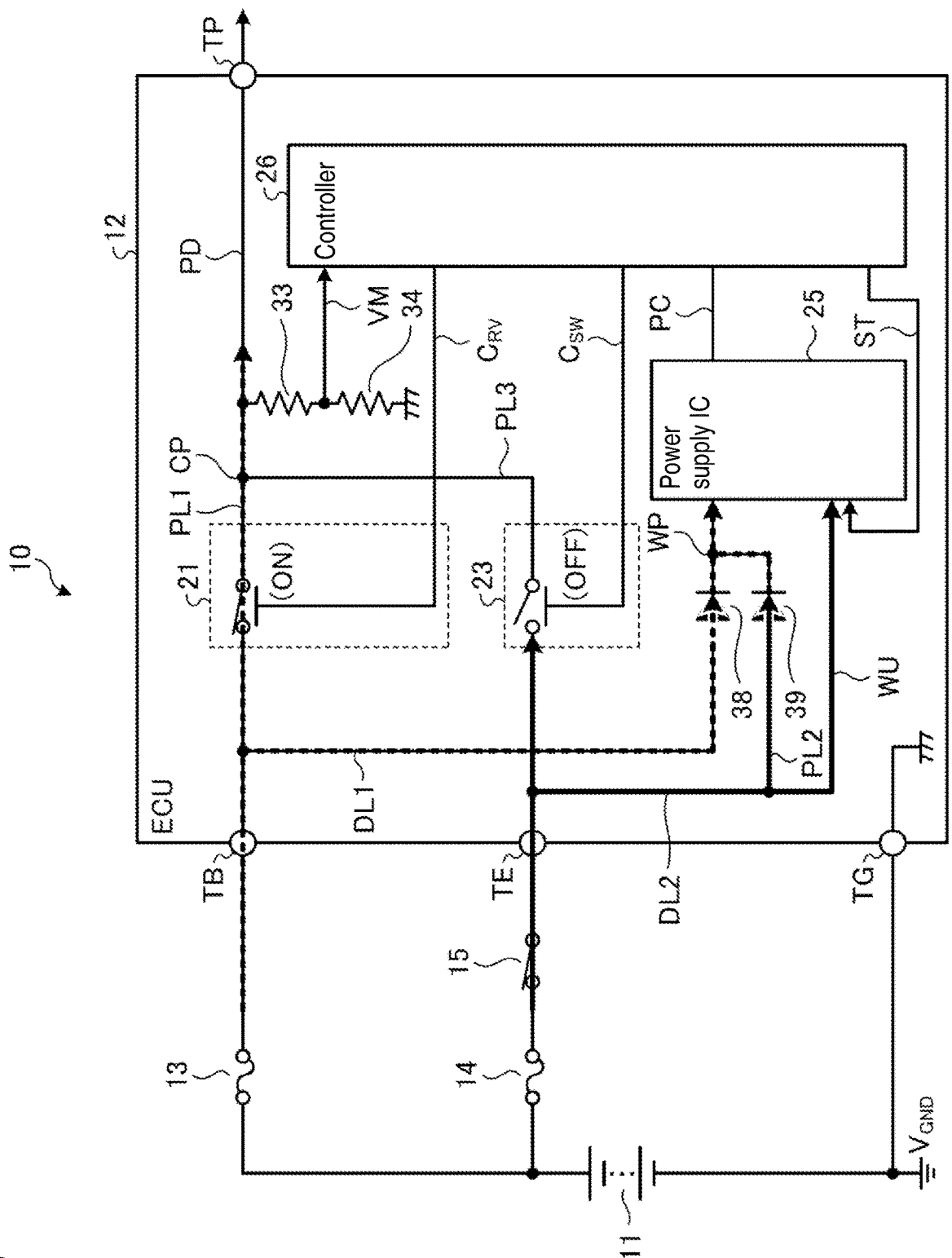
FIG. 3 is an illustrative diagram of ECU operation performed at normal times.

FIG. 3 is an illustrative diagram of ECU operation performed at normal times.

In an initial state, it is assumed that as shown in FIG. 1, the switch 15 is in an off state and the first supply switch 21 and the second supply switch 23 both are in an off state, and furthermore, the NPN bipolar transistor 40 is in an off state.

When, in this state, the switch 15 is placed in an on state by a driver performing a key operation, electric power from the battery 11 is inputted as an "H" level wake-up signal WU to one of the input terminals of the OR circuit 41 in the power supply IC 25 through the fuse 14, the switch 15, and the control power supply terminal TE.

By this, the output terminal of the OR circuit 41 goes to an "H" level, and the NPN bipolar transistor 40 goes into an on state.

Then, since drive power has been supplied to the power supply IC 25 through a first power path DL1 and the first diode 38 in the electric power supplying part 24, electric power from the battery 11 inputted through the battery terminal TB is supplied as controller drive power PC to controller 26 through NPN bipolar transistor 40 in the power supply IC 25.

As a result of those, the controller 26 is activated and sets a maintenance signal ST to an "H" level, by which the supply of the controller drive power PC from the power supply IC 25 is maintained.

Subsequently, the controller 26 places the first supply switch 21 in an on state by a first disconnection control signal $C_{RV}$.

As a result, a portion between the battery terminal TB and the electric power supply terminal TV goes into a conduction state, and electric power supplied from the battery 11 is supplied as electric power for driving PD to the load LD (e.g., an IC driver) at the subsequent stage through the ECU 12, making a transition to a normal operating state.

In parallel with this, the voltage-dividing resistor 33 and the voltage-dividing resistor 34 in the voltage detecting part 22 divide the voltage of the electric power for driving PD, and outputs the divided voltage as a battery monitoring voltage VM to the controller 26.

By this, the controller 26 determines whether the battery monitoring voltage VM is less than or equal to a predetermined threshold voltage (step S12).

In this case, the battery monitoring voltage VM reaches less than or equal to the predetermined threshold voltage, possibly due to an abnormality, e.g., an electric power supply path from the battery 11 to the battery terminal TB through the fuse 13 or the first electric power supply path has been broken or has gone into a ground fault state.

At the determination at step S12, since the battery monitoring voltage VM exceeds the predetermined threshold voltage in a normal state (step S12; No), the controller 26 allows processing to transition to step S11 again, and repeats processes such as those described above at every predetermined timing.

(2) Operation Performed when an Abnormality is Detected

Next, operation performed when an abnormality is detected will be described.

If, at the determination at step S12, the battery monitoring voltage VM is less than or equal to the predetermined threshold voltage, the controller 26 considers that an abnormality has occurred, e.g., the first electric power supply path PEI from the battery 11 to the battery terminal TB through the fuse 13 has been broken or has gone into a ground fault state.

Figure 4:
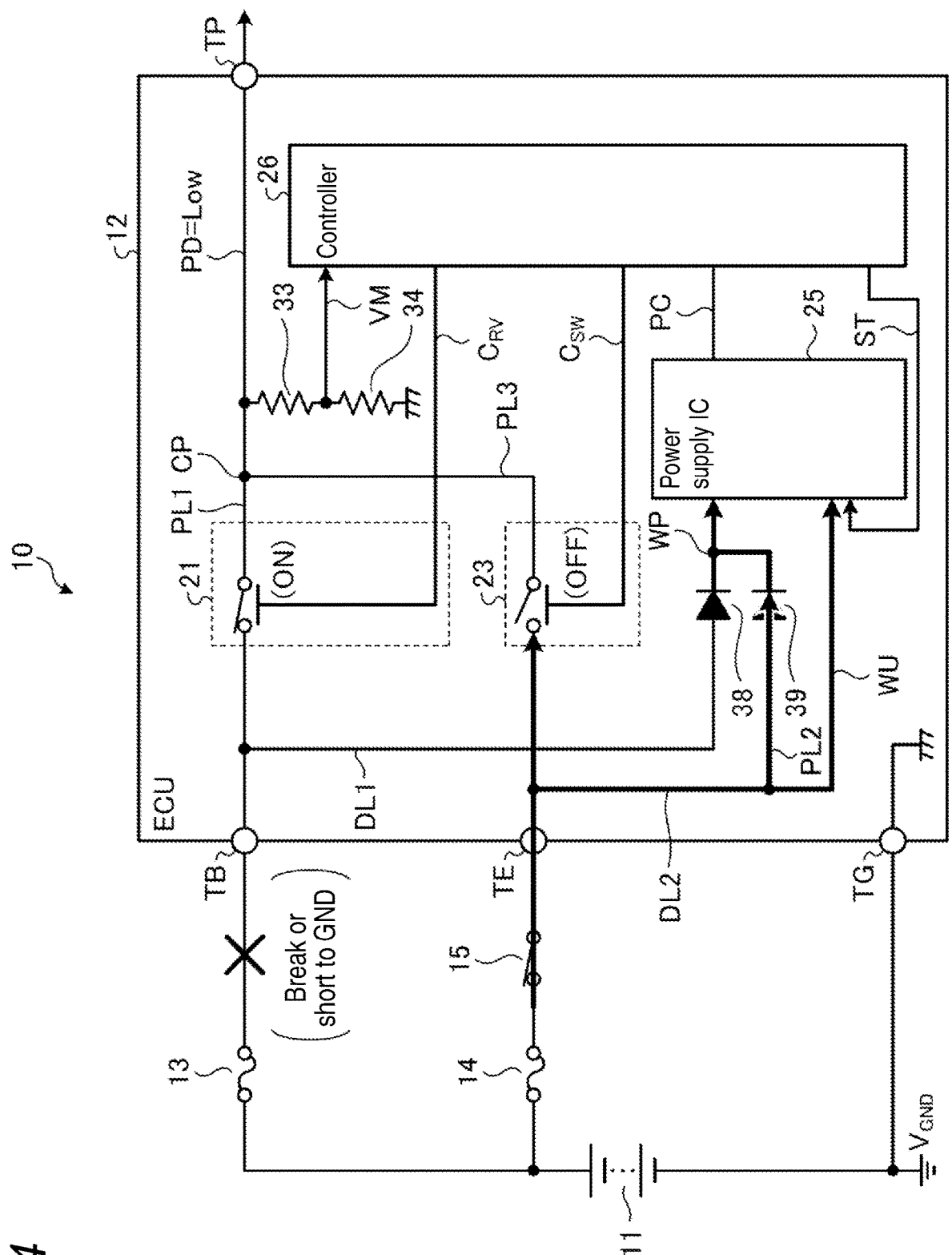
FIG. 4 is an illustrative diagram (part 1) of ECU operation performed when an abnormality is detected.

FIG. 4 is an illustrative diagram (part 1) of ECU operation performed when an abnormality is detected.

In this state, as shown in FIG. 4, despite the fact that the first supply switch 21 is in an on state, electric power supply to the load ED through the battery terminal TB, the first electric power supply path PL1, and the electric power supply terminal TP is cut off and stopped.

Likewise, supply of drive power to the power supply IC 25 through the battery terminal TB, the first power path DL1, and the first diode 38 in the electric power supplying part 24 is also cut off and stopped.

On the other hand, supply of drive power to the power supply IC 25 through the control power supply terminal TE, a second power path DL2, and the second diode 38 in the electric power supplying part 24, i.e., supply of drive power to the power supply IC 25 through the second electric power supply path PL2, continues and supply of controller drive power PC to the controller 26 through the power supply IC continues.

Figure 5:
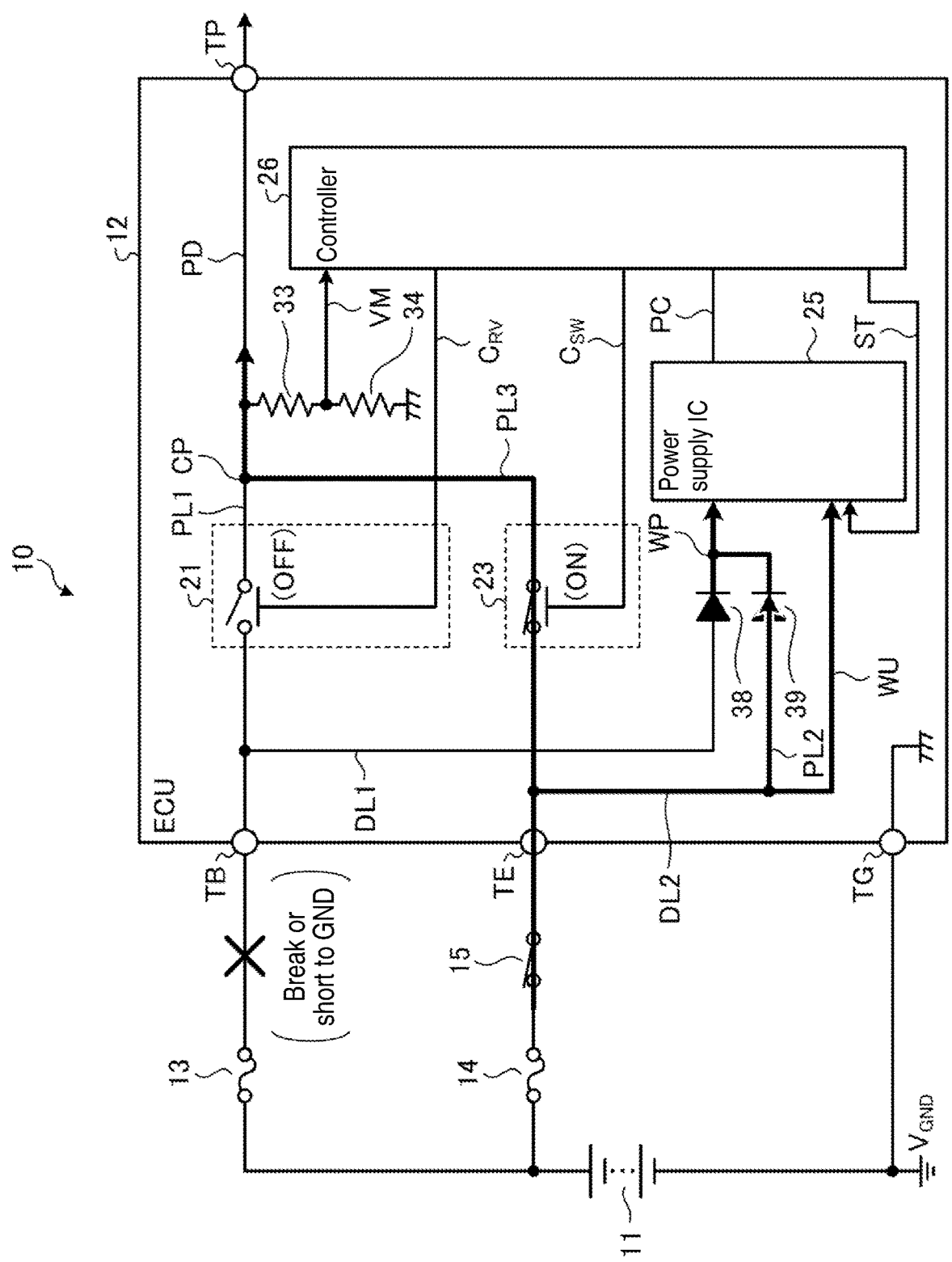
FIG. 5 is an illustrative diagram (part 2) of ECU operation performed when an abnormality is detected.

FIG. 5 is an illustrative diagram (part 2) of ECU operation performed when an abnormality is detected.

Therefore, the controller 26 functions as a control part, and in order to switch an electric power supply path to the load LD to the third electric power supply path PL3 through the control power supply terminal TE, the controller 26 first places the first supply switch 21 functioning as the first disconnecting part in an off state by the first disconnection control signal $C_{RV}$ (step S13).

As a result, the first supply switch 21 functioning as the first disconnecting part goes into an off state, and even if the second supply switch 23 is placed in an on state, a current can be prevented from going around through the control power supply terminal TE, the second supply switch 23, the third electric power supply path PL3, the connecting point CP, and the first power path DL1.

Therefore, since the first supply switch 21 is in an off state by the first disconnection control signal $C_{RV}$, continuous electric power supply to a load LD side through the battery terminal TB does not occur, e.g., even if the battery terminal TB is in a ground fault state, continuous electric power supply does not occur.

Then, the controller 26 places the second supply switch 23 functioning as the second disconnecting part in an on state by a second disconnection control signal $C_{SW}$ (step S14).

As a result, the second supply switch 23 goes into an on state, and electric power supply to the load LD through the control power supply terminal TE, the third electric power supply path PL3 (including the second supply switch 23), the connecting point CP, and the electric power supply terminal TP starts.

As described above, according to the present embodiment, even if power supply to the ECU 12 through the battery terminal TB is stopped due to a break, a ground fault, etc., power supply to the ECU 12 through an electric power supply path that supplies electric power to in-vehicle electrical components, and electric power supply to the load through the ECU 12 can be maintained without making the configuration of the control system for in-vehicle use 10 complex, enabling to improve the reliability of the control system for in-vehicle use 10.

Although some embodiments of the present disclosure have been described, the embodiments are presented as examples and are not intended to limit the scope of the disclosure. These novel embodiments can be implemented in various other modes, and various omissions, substitutions, and changes can be made thereto without departing from the spirit of the disclosure. These embodiments and variants thereof are included in the scope and spirit of the disclosure and included in the features recited in the claims and in the range of equivalency of the claims.

For example, the circuit configurations of the first supply switch 21, the voltage detecting part 22, the second supply switch 23, the electric power supplying part 24, etc., are examples, and other circuit configurations having the same functions can be adopted.

In addition, although in the above description the configuration of the first supply switch 21 has not been described in detail, for example, the first supply switch 21 can be formed as a transistor (a MOS transistor, a bipolar transistor, an insulated gate bi-polar transistor (IGBT), etc.) having a gate terminal whose potential level is controlled directly or through another transistor for control (a bipolar transistor, a MOS transistor, an IGBT, etc.) by the first disconnection control signal $C_{RV}$.

In addition, although the configuration of the second supply switch 23 has not been described in detail, either, for example, the second supply switch 23 can be formed as a MOS transistor group in which a pair of MOS transistors are connected in a back-to-back manner, and the potential level of gate terminals connected in a common manner is controlled directly or through another transistor for control (a bi-polar transistor, a MOS transistor, an IGBT, etc.) by the second disconnection control signal $C_{SW}$.

In addition, an electronic control device for in-vehicle use of the present embodiment has at least the following configurations:

The electronic control device for in-vehicle use (12) of the present embodiment is an electronic control device for in-vehicle use (12) that operates by receiving elect power supply from a battery for in-vehicle use (11), and includes a first electric power supply path (PL1) that supplies electric power which is supplied from the battery for in-vehicle use (11) through an electric power supply terminal (TB), to a load (LD); a first disconnecting part (21) that is provided in the first electric power supply path (PL1) and performs connection/cutoff of the first electric power supply path (PL1); a second electric power supply path (PL2) that supplies electric power which is supplied from the battery for in-vehicle use (11), to a control part (26) that controls the first disconnecting part (21), through a control power supply terminal (TE) and a power supply IC (25); a third electric power supply path (PL3) that supplies electric power which is supplied through the control power supply terminal (TE), to a connecting point (CP) between the first disconnecting part (21) and the load (LD) in the first electric power supply path (PL1) from a point between the control power supply terminal (TE) and the power supply IC (25) in the second electric power supply path; a second disconnecting part (23) that is provided in the third electric power supply path (PL3) and performs connection/cutoff of the third electric power supply path (PL3); and a detecting part that detects a voltage in the first electric power supply path (PL1).

According to this configuration, redundancy of electric power supply paths can be achieved without making a configuration complex.

In addition, the control part (26) of the electronic control device for in-vehicle use (12) of the present embodiment supplies electric power to the load (LD) from the battery for in-vehicle use (11) by controlling the second disconnecting part (23) to connect the third electric power supply path (PL3) to the control power supply terminal (TE), based on the voltage in the first electric power supply path (PL1) detected by the detecting part (22).

According to this configuration, despite the simple configuration, electric power can be securely supplied to the load (LD) through the third electric power supply path (PL3).

In addition, the control part (26) of the electronic control device for in-vehicle use (12) of the present embodiment supplies electric power to the load (LD) from the battery for in-vehicle use (11) by controlling the first disconnecting part (21) to cut off the first electric power supply path (PL1) and controlling the second disconnecting part (23) to connect the third electric power supply path (PL3) to the control power supply terminal (TE), based on the voltage in the first electric power supply path (PL1) detected by the detecting part (22).

According to this configuration, electric power can be securely supplied to the load (LD) through the third electric power supply path (PL3) while a current is prevented from going around from the third electric power supply path (PL3) to a first electric power supply path (PL1) side.

In addition, the control part (26) of the electronic control device for in-vehicle use (12) of the present embodiment cuts off the first electric power supply path (PL1) using the first disconnecting part (21) when the voltage in the first electric power supply path (PL1) detected by the detecting part (22) has reached less than or equal to a predetermined voltage.

According to this configuration, even if electric power supply is cut off on a more upstream side than the connecting point (CP) in the first electric power supply path (PL1), electric power can be securely supplied to the load (LD) through the third electric power supply path (PL3) while a current is prevented from going around from the third electric power supply path (PL3) to the first electric power supply path (PL1) side.

In addition, it is preferred that the electronic control device for in-vehicle use (12) of the present embodiment include a first power path (DL1) that includes a first diode (38) whose anode is connected to the first electric power supply path (PL1) and that is capable of supplying drive power that drives the control part (26), from the battery for in-vehicle use (11); and a second power path (DL2) that includes a second diode (39) whose anode is connected between the second disconnecting part (23) and the control power supply terminal (TE) and whose cathode is connected to a cathode of the first diode (38) and that is capable of supplying the drive power to the control part (26) from the battery for in-vehicle use (11).

According to this configuration, even if an electric power supply path that supplies electric power to the load (LD) from the battery for in-vehicle use (11) is switched, supply of drive power that drives the control part (26) can be securely ensured.

In addition, it is preferred that when a voltage is applied to the second power path (LP2), the power supply IC (25) of the electronic control device for in-vehicle use (12) of the present embodiment start supply of drive power supply power (PC) to the control part (26) through a connecting point (WP) between the first power path second power path.

According to this configuration, furthermore, a switch (15) turns on the control part (26), enabling to activate the control part (26) immediately after application of a voltage to the second power path (DL2).

REFERENCE SIGNS LIST

10: Control system for in-vehicle use, 11: Battery for in-vehicle use, 12: ECU (electronic control device for in-vehicle use), 21: First supply switch (first disconnecting part), 22: Voltage detecting part (detecting part), 23: Second supply switch (second disconnecting part), 24: Electric power supplying part, 25: Power supply IC (drive power supply control part), 26: Controller (control part), 38: First diode, 39: Second diode, $C_{RV}$: First disconnection control signal, $C_{SW}$: Second disconnection control signal, DL1: First power path, DL2: Second power path, PL1: First electric power supply path, and PL2: Second electric power supply path

The invention claimed is:

1. An electronic control device for in-vehicle use that operates by receiving electric power supply from a battery for in-vehicle use, the electronic control device for in-vehicle use comprising:
a first electric power supply path that supplies electric power to a load, the electric power being supplied from the battery for in-vehicle use through an electric power supply terminal;
a first disconnecting part that performs connection/cutoff of the first electric power supply path, the first disconnecting part being provided in the first electric power supply path;
a second electric power supply path that supplies electric power to a control part through a control power supply terminal and a power supply IC, the electric power being supplied from the battery for in-vehicle use, and the control part controlling the first disconnecting part;

a third electric power supply path that supplies electric power to a connecting point between the first disconnecting part and the load in the first electric power supply path from a point between the control power supply terminal and the power supply IC in the second electric power supply path, the electric power being supplied through the control power supply terminal;

a second disconnecting part that performs connection/cutoff of the third electric power supply path, the second disconnecting part being provided in the third electric power supply path; and a detecting part that detects a voltage in the first electric power supply path.

2. The electronic control device for in-vehicle use according to claim 1, wherein the control part supplies electric power to the load from the battery for in-vehicle use by controlling the second disconnecting part to connect the third electric power supply path to the control power supply terminal, based on the voltage in the first electric power supply path detected by the detecting part.

3. The electronic control device for in-vehicle use according to claim 2, wherein the control part supplies electric power to the load from the battery for in-vehicle use by controlling the first disconnecting part to cut off the first electric power supply path and controlling the second disconnecting part to connect the third electric power supply path to the control power supply terminal, based on the voltage in the first electric power supply path detected by the detecting part.

4. The electronic control device for in-vehicle use according to claim 3, wherein the control part cuts off the first electric power supply path using the first disconnecting part when the voltage in the first electric power supply path detected by the detecting part has reached less than or equal to a predetermined voltage.

5. The electronic control device for in-vehicle use according claim 1, comprising:

a first power path capable of supplying drive power from the battery for in-vehicle use, the first power path including a first diode whose anode is connected to the first electric power supply path, and the drive power driving the control part; and a second power path capable of supplying the drive power to the control part from the battery for in-vehicle use, the second power path including a second diode whose anode is connected between the second disconnecting part and the control power supply terminal and whose cathode is connected to a cathode of the first diode.

6. The electronic control device for in-vehicle use according to claim 5, wherein when a voltage is applied to the second power path, the power supply IC starts supply of the drive power supply power to the control part through a connecting point between the first power path and the second power path.

* * * * *